March 3, 1931.  R. M. FIELD  1,794,948
TAP CHANGING SYSTEM
Filed July 18, 1928
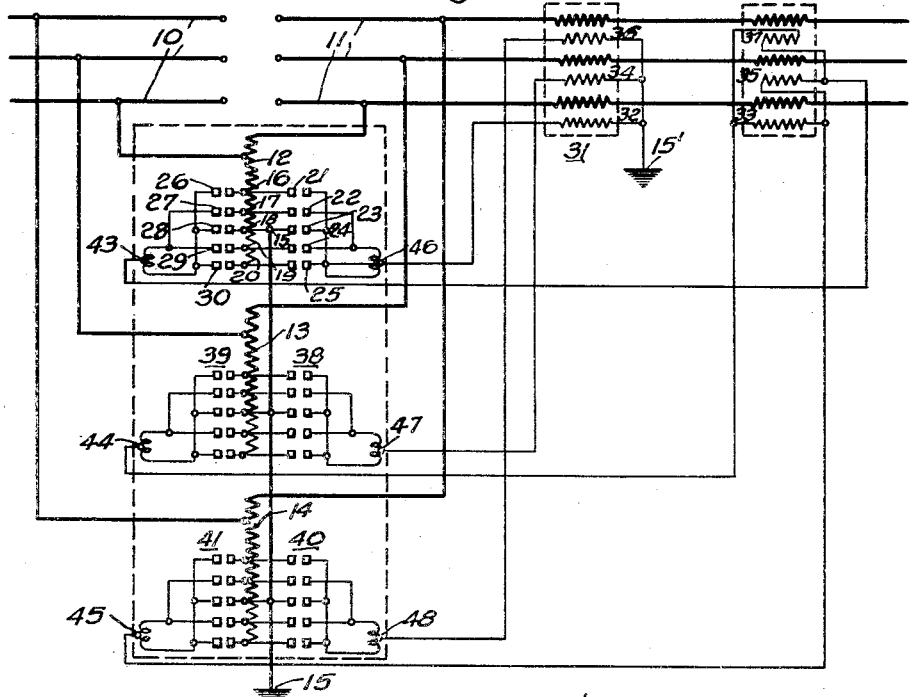
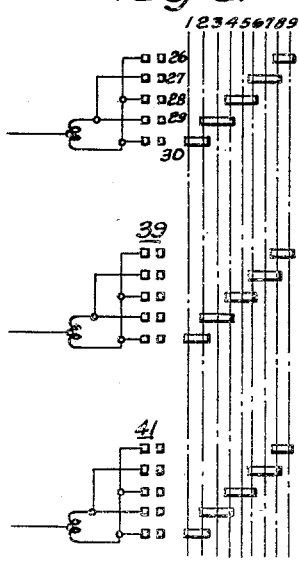
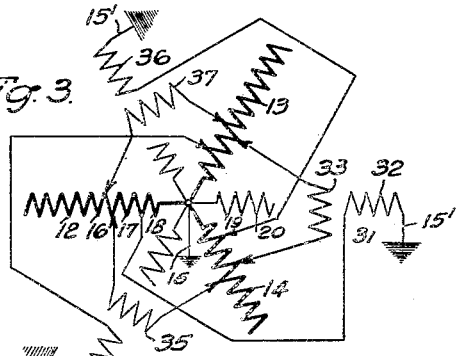
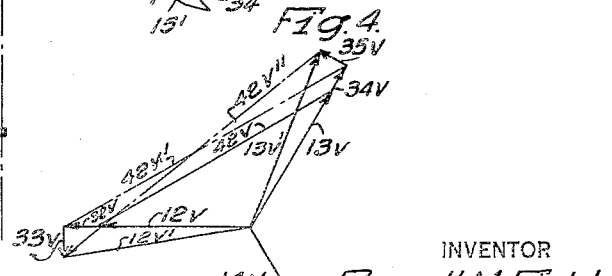
INVENTOR
Russell M. Field.
BY
ATTORNEY Patented Mar. 3, 1931

1,794,948

UNITED STATES PATENT OFFICE

RUSSELL M. FIELD, OF SHARON, PENNSYLVANIA, ASSIGNOR TO WESTINGHOUSE ELECTRIC & MANUFACTURING COMPANY, A CORPORATION OF PENNSYLVANIA

TAP-CHANGING SYSTEM

Application filed July 18, 1928. Serial No. 293,541.

My invention relates generally to the interconnection of power systems and particularly to tap-changing systems for transformers to obtain phase-angle and voltage control of power circuits.

It often occurs, when it is desired to interconnect two power systems, that the phase angle of the two systems is not the same, and, for this reason, it is necessary to introduce means for changing the phase position of the voltage in one system to correspond to that in the other.

During normal operation, little change in the phase position of one system occurs relative to the other, but, under certain conditions of operation, the phase angle of one of the systems may become displaced from its normal position, and it is then desirable to correspondingly change the phase position of the voltage in one of the systems to correspond to that of the other system at, or near, the point of interconnection.

A similar variation occurs between the voltages of the respective power systems, but this variation has been corrected by the introduction of voltage taps on power transformers, whereby the ratio of transformation from one system to another may be altered, either manually or automatically, in accordance with a variation in the voltage of one system from that of the other system.

When transformers are introduced into a power system and so connected with tap-changing apparatus that, by variation in voltage on these transformers, a phase-angle displacement is accomplished in the system, it is impossible to obtain such displacement without either increasing or decreasing the magnitude of the voltage in the system. That is to say, when the phase position of a voltage is altered by the introduction of a second voltage to change the direction of the resultant, it is difficult, with the use of a single transformer, to prevent a slight change in the magnitude of the voltage in the system. I have, accordingly, provided for each phase of one power system, two series transformers, the voltages of which are substantially in quadrature with each other and one of which is in phase with the voltage of the line, so that, upon variation of the voltage in quadrature with the line voltage, a phase displacement is obtained and, consequently, a slight change in the magnitude of the line voltage occurs but such a change in voltage will normally be within the operating limits of the system.

The object of my invention, generally stated, is to provide a transformer for interconnecting power systems.

A further object of my invention is to provide a combination of transformers and tap-changing equipment to effect phase-angle control between the interconnected power systems.

A more specific object of my invention is to provide for energizing two series transformers in each phase of a polyphase power system by voltages in quadrature with each other.

Another object of my invention is to provide a method of connecting auxiliary transformers from a three-phase bank of transformers to obtain voltages substantially in quadrature with each other from the auxiliary transformers.

Other objects of my invention will become apparent to those skilled in the art when the following description is considered in connection with the accompanying drawings, in which:

Figure 1 is a diagrammatic view of an interconnecting system for polyphase power lines, the elements of which are arranged in accordance with my invention;

Fig. 2 is a development view of a cam-operated switch mechanism, such as may be employed in the operation of tap-changing switches utilized in my invention;

Fig. 3 is a diagrammatic view of the transformer windings shown in Fig. 1, wherein the windings are relatively arranged in accordance with the direction of the voltage in each winding; and Fig. 4 is a vector diagram representing the direction and magnitude of the voltages in the transformer windings of Figs. 1 and 3.

Referring now to Fig. 1, two three-phase power systems 10 and 11 are connected to each other through a bank of auto transformers 12, 13 and 14. The auto transformers 12, 13 and 14 are connected in star relation to each other, having their neutral point grounded by the connection 15. The power lines 10 and 11 are so connected to the auto transformers 12, 13 and 14 that, with the voltages in the power lines 10 and 11 at their normal value, the ratio of transformation in the auto transformers 12, 13 and 14 will be appropriate for such interconnection.

The transformers 12, 13 and 14 have their windings divided into a number of sections 16, 17, 18, 19 and 20, shown in Fig. 1, in relation to the auto transformer 12, and these sections may be introduced into, or disconnected from, the circuits of auxiliary transformers upon the operation of any of the tap-changing switches 21, 22, 23, 24 and 25. Upon the operation of any of the tap-changing switches 21 to 30, a corresponding section of the winding of the auto transformer 12 is introduced into the circuit, and a corresponding voltage variation is effected upon the primary winding 31 of a series transformer 32, as will be described hereinafter. It will be understood that, in order to obtain a zero voltage across the primary windings of the series transformers, the middle switch of each group must be in its closed position, connecting the series transformer windings to ground 15.

The series transformers 32 and 33 are connected in series-circuit relation to the same phase of the power line 11 which supplies the auto transformer 12, the series transformers 34 and 35 being connected in the same phase of the power line 11 which supplies the auto transformer 13, and the series transformers 36 and 37 being connected into the same phase of the power line 11 which supplies the auto transformer 14. It is, therefore, apparent that two series transformers are connected in each phase of the power line 11. The series transformers 32, 34 and 36 are connected to produce voltages in phase with the voltage of the power line 11, whereas the series transformers 33, 35 and 37 are connected to produce voltages in quadrature with the voltages of the corresponding phases of the power line 11.

A tap-changing mechanism, embodying the switches 21 to 30 for the auto transformer 12 and the switch groups 38 and 39 for the auto transformer 13, as well as the switch groups 40 and 41 for the auto transformer 14, is provided to permit a variation in the voltage on the primary windings of the series transformers 32 to 37, inclusive, so that the desired changes in phase displacement, consequent upon variation in the voltage applied to the primary windings of the series transformers 33, 35 and 37, as well as a variation of the in-phase component, that is to say, the magnitude of the voltage in the power line 11 upon a change in the voltage applied to the primary windings of the series transformers 32, 34 and 36, may be accomplished.

From Fig. 3, it will be apparent that the voltage induced in the series transformer 32 is in phase with the voltage in the auto transformer 12, since the primary winding 31 is connected in parallel with the section 18 of the auto transformer 12 and may be connected in parallel with other sections of the winding of the auto transformer 12 by proper operation of the switches 21 to 25 of Fig. 1. It is further apparent that the voltage in the series transformer 34 is in phase with the voltage in the auto transformer 13, since the primary winding of the series transformer 34 is connected between an intermediate point of the auto transformer 13 and the ground connection 15'. It is also apparent that the voltage in the series transformer 36 will be in phase with the voltage in the auto transformer 14, for the same reason.

The primary winding of the series transformer 33 is connected between an intermediate point on the winding of the auto transformer 13 and an intermediate point on the winding of the auto transformer 14 and, as shown by the winding diagrams in Fig. 3 and the vector diagram in Fig. 4. With such a connection, the voltages supplied to the primary windings of the series transformers 32 and 33 are substantially in quadrature with each other. Similarly, the voltage supplied to the primary winding of the series transformer 35 is in quadrature with the voltage supplied to the primary winding of the series transformer 34 and, also, the voltage supplied to the primary winding of the series transformer 37 is in quadrature with the voltage supplied to the primary winding of the series transformer 36.

If the voltage supplied to the primary winding of the series transformers 33, 35 and 37 be varied, a voltage component at right angles to the voltage of the power line 11 will be introduced into the system, and a corresponding phase displacement and change in voltage magnitude will occur. Since, however, the voltage introduced is at right angles to the voltage of the power line 11, a greater change will occur in the phase displacement than will occur in the voltage magnitude. Such change as occurs in the voltage magnitude will, in practice, be within the operating limits of the system but may be compensated for by a tap-changing operation to increase or decrease the voltage applied to the primary windings of the series transformers 32, 34 and 36 which, it will be remembered, are in phase with the voltage of the power line 11 and, by suitable manipulation of the in-phase and quadrature components supplied, respectively, by the series transformers 32, 34, 36 and 33, 35 and 37, any desired change in phase position of the voltage of the power line 11 may be accomplished, which is within the limits of the apparatus.

The vector diagrams of Fig. 4 represent the relative direction and magnitudes of voltages in windings when the connection is such as is shown in Fig. 3. It will be recalled that the voltage vectors 32v and 33v are both applied to the same phase of the power circuit 11, and that they are in quadrature, as represented by the vector diagram. Further, it will be apparent to those skilled in the art that, when a change takes place in the magnitude of the quadrature voltages 33v and 35v, a change in the phase angle and in the magnitude of the between-phase voltage 42v will occur, as evidenced by 42v' and 42v'', but the difference between the lengths of the vectors 42v' and 42v'' is well within the allowable operating limits of a system so that it is not undesirable. A change in the magnitude or length of the vector 42v will occur, however, upon variation of the voltage 32v, as will be seen by comparing the lengths of the vectors 42v and 42v'. It is, therefore, possible to accomplish an accurate adjustment of both the phase position and the magnitude of the voltage represented by the vector 42v which represents the phase voltage of the power line 11 connected to the winding of the auto transformer 12.

The tap-changing switches 21 to 25 and 26 to 30 for the auto transformer 12, the switch groups 38 and 49 for the auto transformer 13 and the switch groups 40 and 41 for the auto transformer 14 may each be operated, in a manner well known in the art, by a drum controller or by a similar device such as that shown in the development diagram of Fig. 2. In this case, however, it is desired to control the voltages applied to each group of series transformers simultaneously, or, that is to say, simultaneously control the voltages applied to the series transformers 33, 35 and 37 by the operation of a single controller and to simultaneously control the voltage applied to the primary windings of the series transformers 32, 34 and 36 by the operation of a similar controller.

The drum development of the controller, shown in Fig. 2, must be construed as merely a typical method of operating the tap-changing switches, and must not be considered as that which will necessarily be utilized in practice. The operation of such devices is well known to those skilled in the art and it will be understood that, when the controller is advanced to the position 1, the contact members 30 and the corresponding contact members of the groups 39 and 41 will become engaged, and a voltage will be applied to the primary winding of the series transformer 35 which will correspond to the resultant of the voltages in the sections 19 and 20 of the auto transformer 12 and a similar section of the auto transformer 14 or that is the voltage between the tap connection for the switch 30 and the tap connection of the corresponding switch of the group 39, the resultant voltage being represented by the vector 33v of Fig. 4.

In the embodiment shown, two controllers, such as that shown in Fig. 2, are employed, one of which may operate the switches 26 to 30 and the switch groups 39 and 41, the corresponding switches of the three groups being actuated simultaneously, upon movement of the controller. Another controller, substantially like that shown in Fig. 2, is provided for the operation of the switches 21 to 25 and the switch groups 38 and 40. The sequence of actuation of the switches by the last-mentioned controller is, in this embodiment, exactly the same as the sequence of actuation by the first controller, and the corresponding switch is actuated in each switch group upon a movement of the controller drum.

If a phase displacement exists between the voltage of the power line 10 and that of the power line 11, the tap-changing controller which operates the switches 26 to 30 and the switch groups 39 and 41 may be advanced to its first position, in which the contact members 30 will become engaged, and the corresponding contact members of the switch groups 39 and 41 will become engaged. The series transformers 33, 35 and 37 are thereby connected in delta relation and through the preventive auto-transformers 43, 44 and 45 which are connected to the lowermost tap of each of the auto transformers 12, 13 and 14. The controller may, of course, be advanced farther until the desired phase position of the voltage in the power line 11 is obtained.

Upon energization of the primary windings of the series transformers 33, 35 and 37, a voltage is induced in the corresponding secondary windings, the direction of which, as described hereinbefore, is at right angles to the voltage of the power line 11, and a voltage represented by the voltage vector 33v is introduced into the system to change the phase position of the voltage of the power line 11, as indicated by the voltage vectors 42v and 42v''. Further operation of this controller will actuate the corresponding switches in each group to 29, 28, 27 and 26, successively, and it will be observed from the drum development that, upon the initial closure of one switch, the preceding switch remains in its closed position and, in this way, the equivalent of an intermediate connection is accomplished, so that nine variations of voltage by the changing of taps are possible with the use of five switches in conjunction with the preventive auto transformers 43 to 48, inclusive.

It will be observed that the series transformers 32, 34 and 36 are connected in star relation, with their neutral point grounded, so that the voltage which is applied to the primary winding of each of the series transformers 32, 34 and 36 corresponds to the voltage which exists between the point of tapping and the ground connection 15 in each of the transformers 12, 13 and 14.

Upon the movement of the controller which operates the switches 21 to 25 and the switch groups 38 and 40, a variable voltage is obtained upon the primary windings of the series transformers 32, 34 and 36, the direction of which is changed 180° while passing through the period of zero voltage in which the switch 23 stands in its closed position. It is also possible to vary the voltage on the series transformers 33, 35 and 37 from a maximum value through zero and to a maximum value in the opposite direction, the zero value being when the switch 28 and the corresponding switches of groups 39 and 41 stand in their closed position. It is, therefore, possible to reverse the direction and effect of the vectors 32v and 34v and also of vectors 33v and 35v of Fig. 4. Accordingly, a substantially accurate adjustment may be obtained upon both the phase position and the magnitude of the voltage in the power line 11 by adjusting the voltage which is applied to the primary windings of the series transformers 32 to 37, or, that is to say, the introduction of in-phase and in-quadrature voltage components into the power line 11 and a variation of these components to obtain a desired voltage magnitude and phase position.

Since it will be possible to modify the embodiment hereinbefore set forth and adapt it to various applications without departing from the spirit and scope of the invention, it is desired that the foregoing description be construed as merely illustrative and not in a limiting sense.

I claim as my invention:—

1. An interconnecting system for power lines comprising, in combination, two power lines, a main transformer connected between said power lines, means for varying the voltage ratio between said power lines comprising a variable-voltage auxiliary transformer connected to one of said power lines and energized from said main transformer, and means for varying the phase displacement between the voltages of the two power lines comprising a variable voltage auxiliary transformer energized from said main transformer.

2. An interconnecting system for power lines comprising, in combination, two power lines, a main transformer connected to said power lines, a variable-voltage series transformer so connected to said main transformer as to supply an out-of-phase voltage to one of the power lines, whereby the phase position of a vector quantity of the power line may be adjusted, and a variable-voltage series transformer disposed to supply an in-phase voltage to one of the power lines, whereby the magnitude of the resultant voltage may be regulated.

3. In an interconnected power system, a plurality of transmission lines, a transformer connecting the transmission lines, an auxiliary transformer having primary and secondary windings, said secondary winding being connected in series with one of the transmission lines, said primary winding being energized by a voltage substantially in quadrature to the voltage of the transmission line, means for varying the voltage of the auxiliary transformer to effect a change in phase displacement between the voltages of the transmission lines.

4. In an interconnected power system, a plurality of transmission lines, a transformer connecting the transmission lines, a plurality of auxiliary transformers having primary and second windings, said secondary windings being connected in series-circuit relation to one of the transmission lines, the primary windings being supplied with voltages of substantial phase displacement, and means for varying the voltage on said primary windings to effect a variation in the phase position of the resultant voltage in said transmission line.

5. In an interconnected power system, a plurality of transmission lines, a main transformer connecting the transmission lines, a plurality of auxiliary transformers having primary and secondary windings, said secondary windings being connected in series-circuit relation to one of the transmission lines, the primary windings being connected to said main transformer and supplied with voltages of substantial phase displacement, and independent voltage-varying means for each of the primary windings to respectively effect a change in phase position of the line voltage, and in magnitude of the line voltage consequent to said phase variation.

6. In an interconnecting system for polyphase power lines, a star-connected bank of auto-transformers connecting the power lines, a plurality of auxiliary transformers having primary and secondary windings, said secondary windings being connected in series-circuit relation to one power line, the primary windings of certain of said auxiliary transformers being connected in parallel-circuit relation to a portion of the auto-transformer winding of the corresponding phase, the primary winding of other of said auxiliary transformers being connected in delta relation between intermediate points on the windings of the auto-transformers, the secondary windings of said last-mentioned auxiliary transformers being connected in each phase of the transmission line having their voltages substantially in quadrature, and means for varying the voltage on the primary windings to effect a change in the phase position of the voltage on the transmission lines.

7. In an interconnecting system for polyphase power lines, a bank of auto-transformers disposed to reduce the normal voltage of one power line to the normal voltage of the other power line, a variable-voltage series transformer in each phase of the one power line for varying the magnitude of the voltage of said power line, whereby the normal ratio between the voltages of the respective power lines may be maintained, a variable-voltage series transformer in each phase of one power line for varying the phase displacement between the voltages of the respective power lines, whereby the voltages of the respective power lines may be maintained in a fixed phase relation.

8. In an interconnecting system for polyphase power lines, a bank of auto-transformers disposed between the power lines, a plurality of series transformers connected in each phase of one power line, the voltages in the series transformer in each phase being substantially in quadrature, and means for separately varying the voltages of the series transformers in the same phase, whereby the phase position of the voltage in one power line may be adjusted by one series transformer and a change in voltage magnitude adjusted by another transformer connected in the same phase.

9. In combination with a three-phase star-connected transformer bank, a power line supplying the transformer, a pair of series transformers connected in each phase of one power line, the primary winding of one of said series transformers in each phase being connected in parallel circuit relation to a portion of the winding of the transformer bank connected to the same phase as the secondary winding of said series transformer, the primary winding of the other series transformer connected in that phase being connected between intermediate points on the windings of the transformer bank energized by the opposite phases, whereby the voltage in the first said series transformer is substantially in quadrature to the voltage in the last said series transformer.

10. In combination, two power circuits, a transformer connected in energy-transmitting relation to said power circuits, means energized from said transformer for introducing a variable voltage into one of said circuits that is substantially in phase with the voltage of that circuit, and means energized from said transformer for introducing a variable voltage into one of said circuits that is substantially in quadrature with the voltage of that circuit.

In testimony whereof, I have hereunto subscribed my name this 27th day of June, 1928.

RUSSELL M. FIELD.